United States Patent
Chouvel

(10) Patent No.: US 11,674,019 B2
(45) Date of Patent: Jun. 13, 2023

(54) TIRE PROVIDED WITH AN OUTER SIDEWALL COMPRISING A LIQUID PLASTICIZER HAVING A LOW GLASS TRANSITION TEMPERATURE

(71) Applicant: COMPAGNIE GENERALE DES ETABLISSEMENTS MICHELIN, Clermont-Ferrand (FR)

(72) Inventor: Christophe Chouvel, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 302 days.

(21) Appl. No.: 16/764,572

(22) PCT Filed: Nov. 16, 2018

(86) PCT No.: PCT/FR2018/052863
§ 371 (c)(1),
(2) Date: May 15, 2020

(87) PCT Pub. No.: WO2019/097175
PCT Pub. Date: May 23, 2019

(65) Prior Publication Data
US 2020/0392311 A1    Dec. 17, 2020

(30) Foreign Application Priority Data

Nov. 17, 2017  (FR) ...................................... 1760837

(51) Int. Cl.
*B60C 1/00* (2006.01)
*C08L 9/00* (2006.01)
*C08L 53/02* (2006.01)
*C08K 5/103* (2006.01)

(52) U.S. Cl.
CPC .............. *C08L 9/00* (2013.01); *B60C 1/0025* (2013.01); *C08L 2205/03* (2013.01); *C08L 2205/06* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 3,464,477 A | 9/1969 | Verdier | |
| 4,946,899 A | 8/1990 | Kennedy et al. | |
| 5,977,238 A | 11/1999 | Labauze | |
| 6,013,718 A | 1/2000 | Cabioch et al. | |
| 6,075,084 A | 6/2000 | Mabry et al. | |
| 6,503,973 B2 | 1/2003 | Robert et al. | |
| 6,774,255 B1 | 8/2004 | Tardivat et al. | |
| 6,815,473 B2 | 11/2004 | Robert et al. | |
| 6,849,754 B2 | 2/2005 | Deschler et al. | |
| 7,217,751 B2 | 5/2007 | Durel et al. | |
| 7,250,463 B2 | 7/2007 | Durel et al. | |
| 7,312,264 B2 | 12/2007 | Gandon-Pain | |
| 7,335,692 B2 | 2/2008 | Vasseur et al. | |
| 7,488,768 B2 | 2/2009 | Tardivat et al. | |
| 7,510,670 B2 | 3/2009 | Chaves et al. | |
| 7,641,753 B2 | 1/2010 | Gao et al. | |
| 7,820,771 B2 | 10/2010 | Lapra et al. | |
| 8,461,269 B2 | 6/2013 | Varagniat et al. | |
| 8,492,475 B2 | 7/2013 | Araujo Da Silva et al. | |
| 8,883,929 B2 | 11/2014 | Gandon-Pain et al. | |
| 8,957,155 B2 | 2/2015 | Seeboth et al. | |
| 9,010,393 B2 | 4/2015 | Araujo Da Silva et al. | |
| 10,471,775 B2 | 11/2019 | Fugier et al. | |
| 2001/0036991 A1 | 11/2001 | Robert et al. | |
| 2002/0016404 A1 | 2/2002 | Mabry et al. | |
| 2002/0037962 A1 | 3/2002 | Lechtenbohmer et al. | |
| 2002/0183436 A1 | 12/2002 | Robert et al. | |
| 2003/0005993 A1 | 1/2003 | Omoto et al. | |
| 2004/0051210 A1 | 3/2004 | Tardivat et al. | |
| 2004/0127617 A1 | 7/2004 | Vasseur et al. | |
| 2004/0132880 A1 | 7/2004 | Durel et al. | |
| 2004/0225044 A1 | 11/2004 | Chen | |
| 2005/0004297 A1 | 1/2005 | Durel et al. | |

(Continued)

FOREIGN PATENT DOCUMENTS

| | | |
|---|---|---|
| CN | 103517812 A | 1/2014 |
| EP | 1097966 A1 | 5/2001 |

(Continued)

OTHER PUBLICATIONS

IARC Monographs on the Evaluation of Carcinogenic Risks to Humans vol. 93 Carbon Black,Titanium Dioxide and Talc; (2010) pp. 43-56. (Year: 2010).*
Melting and Blass Transitions in Paraffinic and Naphthenic Oils, National Research Council Canada (2006) pp. 1-26. (Year: 2006).*
Viscoelastic and Gelation Studies of SEBS . . . Macromolecular Research vol. 14 No. 3 (2006) pp. 365-372. (Year: 2006).*
International Search Report dated Feb. 22, 2019, in corresponding PCT/FR2018/052863 (4 pages).
R. Mildenburg, et al., "Hydrocarbon Resins", VCH, New York, chapter 5.5, pp. 141-146 (1997).
E. Camano, et al., "Evaluation of the Thermal Diffusivity of Rubber Compounds Through the Glass Transition Range", J. Appl. Polymer Sci., vol. 63, No. 2, pp. 157-162 (1997).

(Continued)

*Primary Examiner* — David J Buttner
(74) *Attorney, Agent, or Firm* — Venable LLP

(57) ABSTRACT

A tire is provided with an external sidewall, said external sidewall comprising a composition based on at least one elastomeric matrix comprising at least one diene elastomer selected from the group consisting of butadiene polymers having a glass transition temperature of less than or equal to −50° C., and a thermoplastic elastomer comprising at least one elastomer block and at least one thermoplastic block, the thermoplastic elastomer not comprising a polyisobutylene block; a liquid plasticizer exhibiting a glass transition temperature of less than −70° C.; a crosslinking system; and a reinforcing filler.

13 Claims, No Drawings

(56) References Cited

U.S. PATENT DOCUMENTS

| | | |
|---|---|---|
| 2005/0147779 A1 | 7/2005 | Gao et al. |
| 2006/0089445 A1 | 4/2006 | Gandon-Pain |
| 2007/0161735 A1 | 7/2007 | Bergman |
| 2007/0228322 A1 | 10/2007 | Chaves et al. |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2010/0022714 A1 | 1/2010 | Varagniat et al. |
| 2010/0145089 A1 | 6/2010 | Mignani et al. |
| 2011/0021702 A1 | 1/2011 | Gandon-Pain et al. |
| 2011/0152458 A1 | 6/2011 | Araujo Da Silva et al. |
| 2011/0294953 A1 | 12/2011 | Seeboth et al. |
| 2012/0208948 A1 | 8/2012 | Gandon-Pain et al. |
| 2013/0116376 A1 | 5/2013 | Custodero et al. |
| 2013/0289183 A1* | 10/2013 | Kerns .................. C08F 236/10 524/313 |
| 2013/0299053 A1 | 11/2013 | Fugier et al. |
| 2014/0076473 A1 | 3/2014 | Abad et al. |
| 2014/0083589 A1 | 3/2014 | Abad et al. |
| 2014/0299249 A1 | 10/2014 | Custodero et al. |
| 2015/0034226 A1 | 2/2015 | Abad et al. |
| 2015/0034230 A1 | 2/2015 | Abad et al. |
| 2016/0130426 A1 | 5/2016 | Miyazaki et al. |
| 2016/0339743 A1 | 11/2016 | Abad et al. |
| 2016/0347121 A1 | 12/2016 | Greiveldinger et al. |
| 2017/0151842 A1 | 6/2017 | Custodero et al. |
| 2017/0151843 A1 | 6/2017 | Custodero et al. |
| 2017/0313130 A1 | 11/2017 | Chouvel et al. |
| 2018/0043734 A1 | 2/2018 | Greiveldinger et al. |
| 2018/0178584 A1 | 6/2018 | Chouvel |
| 2018/0258260 A1 | 9/2018 | Tokimune et al. |
| 2019/0002671 A1* | 1/2019 | Sato .......................... C08L 9/06 |
| 2019/0144644 A1* | 5/2019 | Takeda .................. B60C 1/0016 523/156 |
| 2019/0144646 A1 | 5/2019 | Miura |
| 2019/0300640 A1 | 10/2019 | Custodero et al. |
| 2019/0300684 A1 | 10/2019 | Chouvel |
| 2021/0214530 A1 | 7/2021 | Chouvel et al. |

FOREIGN PATENT DOCUMENTS

| | | |
|---|---|---|
| EP | 1127909 A1 | 8/2001 |
| EP | 1231080 A1 | 8/2002 |
| EP | 1270273 A1 | 1/2003 |
| EP | 1357149 A2 | 10/2003 |
| EP | 1462479 A1 | 9/2004 |
| EP | 1524109 A2 | 4/2005 |
| EP | 1707596 A1 | 10/2006 |
| EP | 1033265 A2 | 9/2009 |
| EP | 2716700 A1 | 4/2014 |
| EP | 3216827 A1 | 9/2017 |
| FR | 1502689 | 11/1967 |
| FR | 2740778 A1 | 5/1997 |
| FR | 2765882 A1 | 1/1999 |
| JP | 2012131860 * | 7/2012 |
| WO | 97/36724 A2 | 10/1997 |
| WO | 99/09036 A1 | 2/1999 |
| WO | 99/16600 A1 | 4/1999 |
| WO | 01/42353 A1 | 6/2001 |
| WO | 01/92402 A1 | 12/2001 |
| WO | 02/30939 A1 | 4/2002 |
| WO | 02/31041 A1 | 4/2002 |
| WO | 02/083782 A1 | 10/2002 |
| WO | 02/088238 A1 | 11/2002 |
| WO | 03/016387 A1 | 2/2003 |
| WO | 2004/096865 A2 | 11/2004 |
| WO | 2006/023815 A1 | 3/2006 |
| WO | 2006/047509 A2 | 5/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006125534 A1 | 11/2006 |
| WO | 2007061550 A1 | 5/2007 |
| WO | 2007/098080 A2 | 8/2007 |
| WO | 2008/003434 A1 | 1/2008 |
| WO | 2008/003435 A1 | 1/2008 |
| WO | 2008/055986 A2 | 5/2008 |
| WO | 2010/072685 A1 | 7/2010 |
| WO | 2012/076456 A1 | 6/2012 |
| WO | 2013/087485 A1 | 6/2013 |
| WO | 2017/093687 A1 | 6/2017 |

OTHER PUBLICATIONS

Zs. Fodor, et al., "Polyisobutylene-containing block polymers by sequential monomer addition", Polymer Bulletin 29, 697-704 (1992).

G. Kaszas, et al., "New Thermoplastic Elastomers of Rubbery Polyisobutylene and Glassy Cyclopolyisoprene Segments", J. Appl. Polymer Sci., vol. 39, pp. 119-144 (1990).

J.P. Kennedy, et al., "Polyisobutylene-Containing Block Copolymers by Sequential Monomer Addition", Macromolecules 1991, 24, 6572-6577.

J.E. Puskas, "New Transparent Flexible UV-Cured Films from Polyisobutylene-Polyisoprene Blcok Polymers", J. Macromol. Sci.—Chem., A28(1), pp. 65-80 (1991).

J.E. Puskas, et al., "Polyisobutylene-Containing Block Copolymers by Sequential Monomer Addtion", J. Polymer Sci.: Part A: Polymer Chemistry, vol. 30, 41-48 (1992).

S. Brunauer, et al., "Adsorption of Gases in Multimolecular Layers", J. Am. Chem. Soc., vol. 60, pp. 309-319 (1938).

* cited by examiner

TIRE PROVIDED WITH AN OUTER SIDEWALL COMPRISING A LIQUID PLASTICIZER HAVING A LOW GLASS TRANSITION TEMPERATURE

BACKGROUND

The present invention relates to tyres and more particularly to tyre external sidewalls, that is to say, by definition, to elastomeric layers located radially on the outside of the tyre, which are in contact with the ambient air.

It is possible to define, within the tyre, three types of regions:

The radially exterior region in contact with the ambient air, this region being essentially composed of the tread and of the external sidewall of the tyre. An external sidewall is an elastomeric layer positioned outside the carcass reinforcement with respect to the internal cavity of the tyre, between the crown and the bead, so as to completely or partially cover the region of the carcass reinforcement extending from the crown to the bead.

The radially interior region in contact with the inflation gas, this region generally being composed of the layer airtight to the inflation gas, sometimes known as inner liner.

The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.

The external sidewall can, depending on the requirements, comprise one or more protective plies, located on the outside with respect to the carcass reinforcement, the role of which protective plies is to protect the rest of the structure of the sidewall from external attacks: impacts, tears or other perforations.

This is, for example, the case in the sidewalls of certains tyres intended for rolling over relatively rough ground, for example on rally-type passenger vehicles or else on industrial off-road vehicles of the construction site type.

These protective plies must be sufficiently flexible and deformable so as, on the one hand, to follow as closely as possible the shape of the obstacle on which the sidewall is liable to bear during rolling and, on the other hand, to prevent the possible penetration of foreign bodies towards the inside of said sidewall. To meet such criteria generally requires the use, in these protective plies or layers, of reinforcing threads in the form of elastic metal-strand cords combining a high elasticity and a high breaking energy.

Such metallic protective plies for tyre sidewalls are well known; they have been described, for example, in Patents or Patent Applications FR 1 502 689 (or U.S. Pat. No. 3,464, 477), EP 1 270 273 (or US 2003/0005993).

However, they exhibit a certain number of disadvantages. Besides the fact that they consequently make the sidewalls of the tyres heavier, they are formed from strand cords which are relatively expensive, on two accounts: first, they are prepared in two stages, namely by prior manufacture of the strands, followed by assembling these strands by twisting; secondly, they generally require a high twist of their wires (i.e., very short helical pitches), a twist which is admittedly essential in order to confer on them the desired elasticity but which involves reduced manufacturing rates. This disadvantage, of course, has repercussions on the cost of the tyres themselves.

Consequently, such modifications to the external sidewall are not applicable to tyres intended for passenger vehicles.

Nevertheless, there is a high demand from users to have available tyres, in particular tyres intended for passenger vehicles, which comprise sidewalls resistant to external attacks, such as impacts, tears or other perforations. It concerns in particular the contacts between the tyre and the pavement, which can seriously damage, indeed even perforate, the tyre.

Furthermore, tyre external sidewalls generally comprise a rubber composition comprising natural rubber. Nevertheless, it is known to a person skilled in the art that the resistance to cracking of compositions comprising, for example, a natural rubber/polybutadiene blend is not optimal.

There thus exists a need to develop a tyre external sidewall which is more resistant to outside attacks.

Furthermore, the document WO 2013/087485 describes a tyre provided with an external sidewall, said external sidewall comprising at least one rubber composition comprising at least one or more diene elastomers and one or more thermoplastic elastomers comprising a polyisobutylene block. It is also indicated that such a tyre exhibits an improved airtightness. The objective of said document is thus not linked to the solving of a problem linked to the resistance to outside attacks.

SUMMARY

Thus, a subject-matter of the invention is a tyre provided with an external sidewall, said external sidewall comprising at least one composition based on at least:
   an elastomeric matrix comprising at least one diene elastomer selected from the group consisting of butadiene polymers having a glass transition temperature of less than or equal to −50° C., and a thermoplastic elastomer comprising at least one elastomer block and at least one thermoplastic block, the thermoplastic elastomer not comprising a polyisobutylene block,
   a liquid plasticizer exhibiting a glass transition temperature of less than −70° C.,
   a crosslinking system, and
   a reinforcing filler.

The tyre according to the invention comprising the external sidewall makes it possible to cause the outside attacker "to slide" over the sidewall and in particular prevents the penetration into the sidewall of an outside attacker or at least minimizes the depth to which the sidewall is attacked during the rubbing of the latter over the outside attacker.

Furthermore, this external sidewall does not necessarily comprise protection by metal and it is consequently easier and faster to prepare. Thus, the cost prices of the tyre according to the invention are reduced, in comparison with tyres comprising sidewalls comprising protection by metal.

Finally, in the case where the external sidewall does not comprise protection by metal, it is more flexible, which improves the perception of comfort for the user, in comparison with a sidewall comprising protection by metal.

The invention and its advantages will be easily understood in the light of the description and implementational examples which follow.

I—DEFINITIONS

The expression "part by weight per hundred parts by weight of elastomer" (or phr) should be understood as meaning, within the meaning of the present invention, the part by weight per hundred parts by weight of elastomers, whether or not they are thermoplastic. In other words, the thermoplastic elastomers are elastomers.

In the present document, unless expressly indicated otherwise, all the percentages (%) shown are percentages (%) by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferentially denoted.

In the present document, the expression composition "based on" is understood to mean a composition comprising the mixture and/or the reaction product of the various constituents used, some of these constituents being able to react and/or being intended to react with one another, at least partially, during the various phases of manufacture of the composition.

When reference is made to a "predominant" compound, this is understood to mean, within the meaning of the present invention, that this compound is predominant among the compounds of the same type in the composition, that is to say that it is the one which represents the greatest amount by weight among the compounds of the same type, for example more than 50%, 60%, 70%, 80%, 90%, indeed even 100%, by weight, with respect to the total weight of the compound type. Thus, for example, a predominant reinforcing filler is the reinforcing filler representing the greatest weight with respect to the total weight of the reinforcing fillers in the composition.

In the context of the invention, the carbon-comprising compounds mentioned in the description can be of fossil origin or biosourced. In the latter case, they can partially or completely result from biomass or be obtained from renewable starting materials resulting from biomass. Polymers, plasticizers, fillers and the like are concerned in particular.

Unless otherwise indicated, the components described in the present document form part of the external sidewall composition of the tyre according to the present invention. Their respective incorporation contents correspond to their contents in the external sidewall composition of the tyre according to the present invention. Thus, unless otherwise indicated, when the expression "the composition" is used, reference is being made to the external sidewall composition of the tyre according to the present invention.

All the values for glass transition temperature "Tg" described in the present document are measured in a known way by DSC (Differential Scanning calorimetry) according to Standard ASTM D3418 (1999).

II—DESCRIPTION OF THE INVENTION

II-1 Elastomeric Matrix

The elastomeric matrix of the external sidewall composition of the tyre according to the invention comprises at least one diene elastomer selected from the group consisting of butadiene polymers having a glass transition temperature of less than or equal to −50° C., and a thermoplastic elastomer comprising at least one elastomer block and at least one thermoplastic block, the thermoplastic elastomer not comprising a polyisobutylene block.

II-1-a Diene Elastomer

According to the invention, the elastomeric matrix comprises at least one diene elastomer is selected from the group consisting of butadiene polymers having a glass transition temperature (Tg) of less than or equal to −50° C.

Diene elastomer should be understood, in a known way, as an elastomer resulting at least in part, that is to say a homopolymer or a copolymer, from diene monomers. In a way known per se, a diene monomer is a monomer comprising two conjugated or non-conjugated carbon-carbon double bonds.

Thus, diene elastomers selected from the group consisting of butadiene polymers should be understood as meaning an elastomer resulting at least in part, that is to say a homopolymer or a copolymer, from butadiene monomers.

Preferably, the diene elastomer(s) selected from the group consisting of butadiene polymers having a glass transition temperature of less than or equal to −50° C. are selected from the group consisting of homopolymers obtained by polymerization of a butadiene monomer; copolymers obtained by copolymerization of one or more conjugated diene monomers, at least one of which is a butadiene monomer, with one another or with one or more vinylaromatic compounds having from 8 to 20 carbon atoms; and the mixtures of these polymers (it being understood that these elastomers exhibit a glass transition temperature (Tg) of less than or equal to −50° C.).

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, or an aryl-1,3-butadiene.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

When the diene elastomer(s) selected from the group consisting of butadiene polymers having a glass transition temperature of less than or equal to −50° C. are selected from copolymers obtained by copolymerization of one or more conjugated dienes, at least one of which is a butadiene monomer, with one another or with one or more vinylaromatic compounds having from 8 to 20 carbon atoms, these can contain between 99% and 20% by weight of butadiene units and between 1% and 80% by weight of vinylaromatic units.

The diene elastomer(s) selected from the group consisting of butadiene polymers having a glass transition temperature of less than or equal to −50° C. which can be used according to the invention can have any microstructure, which depends on the polymerization conditions used, in particular on the presence or absence of a modifying and/or randomizing agent and on the amounts of modifying and/or randomizing agent employed.

The diene elastomer(s) selected from the group consisting of butadiene polymers having a glass transition temperature of less than or equal to −50° C. which can be used according to the invention can, for example, be prepared in dispersion or in solution; they can be coupled and/or star-branched or else functionalized with a coupling and/or star-branching or functionalization agent. For coupling with carbon black, mention may be made, for example, of functional groups comprising a C—Sn bond or aminated functional groups, such as benzophenone, for example; for coupling to a reinforcing inorganic filler, such as silica, mention may be made, for example, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973).

Mention may also be made, as other examples of functionalized elastomers, of elastomers (such as SBR or BR) of the epoxidized type.

The following are suitable in particular as diene elastomer selected from the group consisting of butadiene polymers having a glass transition temperature of less than or equal to −50° C. which can be used in the composition of the external sidewall of the tyre according to the invention: polybutadienes having a content (mol %) of 1,2-units of between 4% and 80% or those having a content (mol %) of cis-1,4-units of greater than 80%, butadiene/styrene copolymers and in particular those having a glass transition temperature Tg (measured according to ASTM D3418 (1999)) of between −50° C. and −70° C. and more particularly between −50° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −50° C. to −80° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −70° C. and −50° C., are especially suitable.

In a particularly preferred way, the diene elastomer(s) selected from the group consisting of butadiene polymers having a glass transition temperature of less than or equal to −50° C. are selected from the group consisting of polybutadienes (abbreviated to "BRs"), butadiene copolymers, preferably butadiene/styrene copolymers (SBRs), isoprene/butadiene copolymers (BIRs) and isoprene/butadiene/styrene copolymers (SBIRs), and the mixtures of these elastomers (it being understood that these elastomers exhibit a glass transition temperature (Tg) of less than or equal to −50° C.).

Preferably again, the diene elastomer(s) selected from the group consisting of butadiene polymers having a glass transition temperature of less than or equal to −50° C. are selected from the group consisting of polybutadienes, butadiene/styrene copolymers and the mixtures of these elastomers (it being understood that these elastomers exhibit a glass transition temperature (Tg) of less than or equal to −50° C.).

Preferably, the content of diene elastomers selected from the group consisting of butadiene polymers having a glass transition temperature of less than or equal to −50° C., in the composition which can be used in the sidewall of the tyre according to the invention, is within a range extending from 50 to 99 phr, preferably from 55 to 95 phr, more preferentially from 60 to 90 phr, more preferentially still from 65 to 85 phr.

II-1-b Thermoplastic Elastomer

According to the invention, the elastomeric matrix comprises at least one thermoplastic elastomer comprising at least one elastomer block and at least one thermoplastic block, the thermoplastic elastomer not comprising a polyisobutylene block.

Unless otherwise indicated, in the present document, when reference is made to "the thermoplastic elastomer", at least one thermoplastic elastomer comprising at least one elastomer block and at least one thermoplastic block, the thermoplastic elastomer not comprising a polyisobutylene block, is denoted.

Thermoplastic elastomer (TPE) is understood to mean, in a known way, a polymer with a structure which is intermediate between a thermoplastic polymer and an elastomer. A thermoplastic elastomer is formed of one or more rigid "thermoplastic" segments connected to one or more flexible "elastomer" segments.

Thus, the thermoplastic elastomer(s) of the composition of the external sidewall which can be used according to the invention comprise at least one elastomer block and at least one thermoplastic block.

Typically, each of these segments or blocks contains at least more than 5, generally more than 10, base units.

Thus, a composition in which a resin or a thermoplastic polymer and an elastomer are mixed does not constitute a thermoplastic elastomer within the meaning of the present invention.

In the present patent application, when reference is made to the glass transition temperature of a thermoplastic elastomer, it is the glass transition temperature relating to the elastomer block (unless otherwise indicated). This is because, in a known way, thermoplastic elastomers exhibit two glass transition temperature (Tg, measured according to ASTM D3418 (1999)) peaks, the lowest temperature being relative to the elastomer part of the thermoplastic elastomer and the highest temperature being relative to the thermoplastic part of the thermoplastic elastomer. Thus, the flexible blocks of the thermoplastic elastomers are generally defined by a Tg of less than or equal to ambient temperature (25° C.), while the rigid blocks have a Tg of greater than or equal to 80° C. In order to be both elastomeric and thermoplastic in nature, the thermoplastic elastomer has to be provided with blocks which are sufficiently incompatible (that is to say, different as a result of their respective weights, their respective polarities or their respective Tg values) to retain their own properties of elastomer block or thermoplastic block.

Preferentially, the elastomer block of the thermoplastic elastomer exhibits a glass transition temperature of less than or equal to −50° C.

Also preferentially, the glass transition temperature of the thermoplastic elastomers (that is to say, of the elastomer block(s) of the thermoplastic elastomers) which can be used according to the invention is greater than −100° C.

The number-average molecular weight (denoted Mn) of the thermoplastic elastomers is preferentially between 30 000 and 500 000 g/mol, more preferentially between 40 000 and 400 000 g/mol, more preferentially still between 50 000 and 300 000 g/mol. Below the minima indicated, there is a risk of the cohesion between the elastomer chains of the thermoplastic elastomers being affected, in particular due to their possible dilution (in the presence of an extender oil); furthermore, there is a risk of an increase in the working temperature affecting the mechanical properties, in particular the properties at break, with the consequence of a reduced "hot" performance. Furthermore, an excessively high Mn can be detrimental to the processing.

The number-average molecular weight (Mn) of the thermoplastic elastomers is determined in a known way, by size exclusion chromatography (SEC). The sample is dissolved beforehand in a suitable solvent at a concentration of approximately 2 g/l and then the solution is filtered through a filter with a porosity of 0.45 µm before injection. The apparatus used is a Waters Alliance chromatographic line. The injected volume of the solution of the polymer sample is 100 µl. The detector is a Waters 2410 differential refractometer and its associated software, for making use of the chromatographic data, is the Empower system. The conditions can be adjusted by a person skilled in the art. For example, in the case of TPEs of COPE type, the elution solvent is hexafluoroisopropanol with sodium trifluoroacetate salt at a concentration of 0.02M, the flow rate is 0.5 ml/min, the temperature of the system is 35° C. and the analytical time is 90 min. Use is made of a set of three Phenomenex columns in series, with "Phenogel" commercial names (pore size: 105, 104, 103 A). For example, in the case of thermoplastic styrene elastomers, the sample is dissolved beforehand in tetrahydrofuran at a concentration of approximately 1 g/l and then the solution is filtered through a filter with a porosity of 0.45 µm before injection. The apparatus used is a Waters Alliance chromatographic line. The elution solvent is tetrahydrofuran, the flow rate is 0.7 ml/min, the temperature of the system is 35° C. and the analytical time is 90 min. A set of four Waters columns in series, with Styragel commercial names (HMW7, HMW6E and two HT6E), is used. The injected volume of the solution of the polymer sample is 100 µl. The detector is a Waters 2410 differential refractometer and its associated software, for making use of the chromatographic data, is the Waters Millennium system. The calculated average molar masses are relative to a calibration curve produced with polystyrene standards.

The polydispersity index (PI=Mw/Mn, with Mw the weight-average molecular weight) of the thermoplastic elastomer(s) is preferably less than 3, more preferentially less than 2 and more preferentially still less than 1.5.

The thermoplastic elastomers which can be used according to the invention can be copolymers with a small number of blocks (less than 5, typically 2 or 3), in which case these blocks preferably have high weights/masses of greater than 15 000 g/mol.

The thermoplastic elastomers can also be copolymers with a large number of smaller blocks (more than 30, typically from 50 to 500), in which case these blocks preferably have relatively low weights/masses, for example from 500 to 5000 g/mol; these thermoplastic elastomers will subsequently be referred to as multiblock thermoplastic elastomers.

The thermoplastic elastomers which can be used according to the invention can be provided in a linear form.

The thermoplastic elastomers can in particular be diblock copolymers: thermoplastic block/elastomer block. They can also be triblock copolymers: thermoplastic block/elastomer block/thermoplastic block, that is to say a central elastomer block and a terminal thermoplastic block at each of the two ends of the elastomer block. Also suitable as thermoplastic elastomers are the mixtures of triblock copolymers and of diblock copolymers described in the present document. This is because the triblock copolymers can contain a minor fraction by weight of diblock copolymer consisting of a rigid styrene segment and of a flexible diene segment, the rigid block and the flexible block being respectively of the same chemical nature, in particular of the same microstructure, as the rigid and flexible blocks of the triblock. The presence of diblock copolymer in the triblock copolymer generally results from the process for the synthesis of the triblock copolymer, which can result in the formation of by-product, such as the diblock copolymer. Generally, the percentage of diblock copolymer in the triblock copolymer does not exceed 40% by weight of triblock copolymer.

The thermoplastic elastomers can also be formed of a linear sequence of elastomer blocks and of thermoplastic blocks (multiblock thermoplastic elastomers).

According to a second alternative form, the thermoplastic elastomers which can be used according to the invention are provided in a star-branched form comprising at least three branches.

For example, the thermoplastic elastomers can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6.

According to a third alternative form, the thermoplastic elastomers which can be used according to the invention are provided in a branched or dendrimer form. The thermoplastic elastomers can then be composed of a branched or dendrimer elastomer block and of a thermoplastic block located at the end of the branches of the dendrimer elastomer block.

As indicated above, the thermoplastic elastomer(s) which can be used according to the invention comprise at least one elastomer block and at least one thermoplastic block, the elastomer block(s) not denoting one or more polyisobutylene blocks.

"Polyisobutylene block" should be understood as meaning, within the meaning of the present invention, a block predominantly composed of the polymerized isobutylene monomer.

The elastomer blocks of the thermoplastic elastomers which can be used according to the invention can be all the elastomers known to a person skilled in the art, with the exception of the thermoplastic elastomers for which the elastomer block(s) denote one or more polyisobutylene blocks.

A distinction is generally made between saturated elastomer blocks and unsaturated elastomer blocks.

Saturated elastomer block is understood to mean that this block essentially comprises units not comprising ethylenic unsaturations (that is to say, carbon-carbon double bonds), that is to say that the units comprising ethylenic unsaturations represent less than 15 mol %, with respect to all of the units of the block under consideration.

The saturated elastomer blocks are generally formed by the polymerization of ethylenic monomers. Mention may in particular be made of polyalkylene blocks, with the exception of polyisobutylene blocks, such as random ethylene/propylene or ethylene/butylene copolymers. These saturated elastomer blocks can also be obtained by hydrogenation of unsaturated elastomer blocks.

They can also be aliphatic blocks resulting from the families of the polyethers, polyesters or polycarbonates. In particular, the saturated elastomer blocks can especially be formed by polyethers, especially polytetra methylene glycols (PTMGs) or polyethylene glycols (PEGs).

According to an alternative form, the monomers polymerized in order to form a saturated elastomer block can be randomly copolymerized with at least one other monomer so as to form a saturated elastomer block. According to this alternative form, the molar fraction of polymerized monomer, other than an ethylenic monomer, with respect to the total number of units of the saturated elastomer block, has to be such that this block retains its saturated elastomer properties. Advantageously, the molar fraction of this other comonomer can range from 0% to 50%, more preferentially from 0% to 45% and more preferentially still from 0% to 40%.

For example, conjugated $C_4$-$C_{14}$ dienes can be copolymerized with the ethylenic monomers, the ethylenic units remaining predominant, as seen above.

Preferably, these conjugated diener are chosen from isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene and a mixture of these conjugated dienes, and preferably these conjugated dienes are chosen from isoprene and a mixture of conjugated dienes containing isoprene.

Unsaturated elastomer block is understood to mean that this block results, at least in part, from conjugated diene monomers, having a content of units of diene origin (conjugated dienes) which is greater than 15 mol %.

When the elastomer blocks of the thermoplastic elastomers which can be used according to the invention are unsaturated, they can be chosen from:
  a) any homopolymer obtained by polymerization of a conjugated diene monomer having from 4 to 12 carbon atoms;
  b) any copolymer obtained by copolymerization of one or more conjugated dienes with one another or with one or more vinylaromatic compounds having from 8 to 20 carbon atoms;
  c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
  d) a copolymer of isobutene and of isoprene (diene butyl rubber) and also the halogenated versions, in particular chlorinated or brominated versions, of this type of copolymer.

The following are suitable in particular as conjugated dines: isoprene, 1,3-butadiene, piperylene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 2-methyl-1,4-pentadiene, 1,3-hexadiene, 2-methyl-1,3-hexadiene, 2-methyl-1,5-hexadiene, 3-methyl-1,3-hexadiene, 4-methyl-1,3-hexadiene, 5-methyl-1,3-hexadiene, 2,5-dimethyl-1,3-hexadiene, 2,5-dimethyl-2,4-hexadiene, 2-neopentyl-1,3-butadiene, 1,3-cyclopentadiene, methylcyclopentadiene, 2-methyl-1,6-heptadiene, 1,3-cyclohexadiene, 1-vinyl-1,3-cyclohexadiene and a mixture of these conjugated dienes; preferably, these conjugated dienes are chosen from isoprene, butadiene and a mixture containing isoprene and/or butadiene.

According to an alternative form, the monomers polymerized in order to form an unsaturated elastomer block can be randomly copolymerized with at least one other monomer so as to form an unsaturated elastomer block. According to this alternative form, the molar fraction of polymerized monomer other than a diene monomer, with respect to the total number of units of the unsaturated elastomer block, has to be such that this block retains its unsaturated elastomer properties. Advantageously, the molar fraction of this other comonomer can range from 0% to 50%, more preferentially from 0% to 45% and more preferentially still from 0% to 40%.

By way of illustration, this other monomer capable of copolymerizing with the first monomer can be chosen from ethylenic monomers, such as ethylene, propylene or butylene, monomers of vinylaromatic type having from 8 to 20 carbon atoms as defined below, or else it can be a monomer such as vinyl acetate.

Styrene monomers, namely methylstyrenes, para-(tert-butyl)styrene, chlorostyrenes, bromostyrenes, fluorostyrenes or also para-hydroxystyrene, are suitable in particular as vinylaromatic compounds. Preferably, the comonomer of vinylaromatic type is styrene.

Thus, according to a preferential embodiment, the at least one elastomer block can be a random copolymer of styrene/butadiene (SBR) type, it being possible for this copolymer to be partially hydrogenated. This SBR block preferably has a Tg (glass transition temperature), measured by DSC according to Standard ASTM D3418 of 1999, of less than −50° C. In a well-known way, the SBR block comprises a styrene content, a content of 1,2-bonds of the butadiene part and a content of 1,4-bonds of the butadiene part, the latter being composed of a content of trans-1,4-bonds and of a content of cis-1,4-bonds when the butadiene part is not hydrogenated. Preferentially, use is made in particular of an SBR block having a styrene content, for example, within a range extending from 10% to 60% by weight, preferably from 20% to 50% by weight, and, for the butadiene part, a content of 1,2-bonds within a range extending from 4% to 75% (mol %) and a content of 1,4-bonds within a range extending from 20% to 96% (mol %).

The degree of hydrogenation is determined by an NMR analysis. The spectra are acquired on a Bruker Avance 500 MHz spectrometer equipped with a 5 mm 1H-X Cryoprobe. The quantitative $^1$H NMR experiment uses a simple 30° pulse sequence and a repetition time of 5 seconds between each acquisition. 64 accumulations are carried out. The samples (approximately 25 mg) are dissolved in approximately 1 ml of $CS_2$; 100 μl of deuterated cyclohexane are added to form the lock during the acquisition. The chemical shifts are calibrated with respect to the protonated impurity of the $CS_2$ $^1$H δ ppm at 7.18 ppm, with reference to TMS ($^1$H δ ppm at 0 ppm). The $^1$H NMR spectrum makes it possible to quantify the microstructure by integration of the broad unresolved peaks of signals characteristic of the different units:
  The styrene originating from the polystyrene blocks and SBR. It is quantifiable in the aromatics region between 6.0 ppm and 7.3 ppm for 5 protons (with subtraction of the integral of the signal of the $CS_2$ impurity at 7.18 ppm).
  The 1,2-PB originating from the SBR. It is quantifiable in the ethylenic region between 4.6 ppm and 5.1 ppm for 2 protons.

The 1,4-PB originating from the SBR. It is quantifiable in the ethylenic region between 5.1 ppm and 6.1 ppm for 2 protons and with deletion of 1 proton of the 1,2-PB unit.

The hydrogenated 1,2-PB originating from the hydrogenation and only exhibiting aliphatic protons. The pendent $CH_3$ groups of the hydrogenated 1,2-PB were identified and are quantifiable in the aliphatic region between 0.4 and 0.8 ppm for 3 protons.

The hydrogenated 1,4-PB originating from the hydrogenation and only exhibiting aliphatic protons. It will be deduced by subtracting the aliphatic protons of the various units, considering it for 8 protons.

The microstructure can be quantified in mol % as follows: mol % of a unit=$^1$H integral of a unit/$\Sigma$($^1$H integrals of each unit). For example, for a styrene unit: mol % of styrene=($^1$H integral of styrene)/($^1$H integral of styrene+$^1$H integral of 1,2-PB+$^1$H integral of 1,4-PB+$^1$H integral of hydrogenated 1,2-PB+$^1$H integral of hydrogenated 1,4-PB).

Preferably, in the thermoplastic elastomers of use for the requirements of the invention, the SBR elastomer block is hydrogenated in such a way that a proportion ranging from 10 mol % to 50 mol % of the double bonds in the butadiene portion are hydrogenated.

Preferably for the invention, the elastomer blocks of the thermoplastic elastomers exhibit a number-average molecular weight (Mn) ranging from 25 000 g/mol to 350 000 g/mol, preferably from 35 000 g/mol to 250 000 g/mol, so as to confer, on the thermoplastic elastomers, good elastomeric properties and a mechanical strength which is sufficient and compatible with the use as tyre external sidewall.

Particularly preferably in the invention, the elastomer block(s) of the thermoplastic elastomer are selected from the group consisting of polyisoprenes, polybutadienes, copolymers of styrene and of butadiene, and the mixtures of these elastomers, these elastomers being non-hydrogenated or partially hydrogenated.

As explained above, the thermoplastic elastomers which can be used according to the invention comprise at least one thermoplastic block.

Thermoplastic block is understood to mean a block formed of polymerized monomers and having a glass transition temperature, or a melting point in the case of semicrystalline polymers, of greater than or equal to 80° C., preferably varying from 80° C. to 250° C., more preferentially varying from 80° C. to 200° C. and in particular varying from 80° C. to 180° C.

This is because, in the case of a semicrystalline polymer, a melting point greater than the glass transition temperature may be observed. In this case, the melting point and not the glass transition temperature is taken into account for the above definition.

The thermoplastic block(s) can be formed from polymerized monomers of various natures.

In particular, the thermoplastic block(s) of the thermoplastic elastomer can be selected from the group consisting of polyolefins (polyethylene, polypropylene), polyurethanes, polyamides, polyesters, polyacetals, polyethers (polyethylene oxide (ethylene polyoxide?), polyphenylene ether), polyphenylene sulfides, polyfluorinated compounds (FEP, PFA, ETFE), polystyrenes, polycarbonates, polysulfones, poly(methyl methacrylate), polyetherimide, thermoplastic copolymers (such as the acrylonitrile/butadiene/styrene (ABS) copolymer) and the mixtures of these polymers.

Particularly preferably in the invention, the thermoplastic block(s) of the thermoplastic elastomer are selected from the group consisting of polystyrenes, polyesters, polyamides, polyurethanes and the mixtures of these polymers.

Very particularly preferably in the invention, the thermoplastic block(s) are selected from the group consisting of polystyrenes, polyesters, polyamides and the mixtures of these polymers.

The thermoplastic block(s) can also be obtained from the monomers chosen from:
acenaphthylene: a person skilled in the art may refer, for example, to the paper by Z. Fodor and J. P. Kennedy, Polymer Bulletin, 1992, 29(6), 697-705;
indene and its derivatives, such as, for example, 2-methylindene, 3-methylindene, 4-methylindene, dimethylindenes, 2-phenylindene, 3-phenylindene and 4-phenylindene; a person skilled in the art may, for example, refer to the patent document U.S. Pat. No. 4,946,899, by the inventors Kennedy, Puskas, Kaszas and Hager, and to the documents by J. E. Puskas, G. Kaszas, J. P. Kennedy and W. G. Hager, Journal of Polymer Science, Part A: Polymer Chemistry (1992), 30, 41, and J. P. Kennedy, N. Meguriya and B. Keszler, Macromolecules (1991), 24(25), 6572-6577;
isoprene, then resulting in the formation of a certain number of trans-1,4-polyisoprene units and of units cyclized according to an intramolecular process; a person skilled in the art may, for example, refer to the documents by G. Kaszas, J. E. Puskas and J. P. Kennedy, Applied Polymer Science (1990), 39(1), 119-144, and J. E. Puskas, G. Kaszas and J. P. Kennedy, Macromolecular Science, Chemistry A28 (1991), 65-80.

According to an alternative form of the invention, the above monomers can be copolymerized with at least one other monomer as long as the latter does not modify the thermoplastic nature of the block, that is to say that the block has a glass transition temperature, or a melting point in the case of semi-crystalline polymers, of greater than or equal to 80° C.

By way of illustration, this other monomer capable of copolymerizing with the polymerized monomer can be chosen from diene monomers, more particularly conjugated diene monomers having from 4 to 14 carbon atoms, and monomers of vinylaromatic type having from 8 to 20 carbon atoms, as are defined in the part relating to the elastomer block.

The thermoplastic block(s) can be chosen from polystyrenes and polymers comprising at least one polystyrene block.

As regards the polystyrenes, the latter are obtained from styrene monomers.

Styrene monomer should be understood as meaning, in the present description, any monomer comprising styrene, both unsubstituted or substituted; mention may be made, among substituted styrenes, for example, of methylstyrenes (for example, o-methylstyrene, m-methylstyrene or p-methylstyrene, α-methylstyrene, α,2-dimethylstyrene, α,4-dimethylstyrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrene), fluorostyrenes (for example, o-fluorostyrene, m-fluorostyrene, p-fluorostyrene, 2,4-difluorostyrene, 2,6-difluorostyrene or 2,4,6-trifluorostyrene) or else para-hydroxystyrene.

According to a preferential embodiment of the invention, the content by weight of styrene in the thermoplastic elastomers which can be used according to the invention is between 5% and 50%, preferentially between 10% and 40%.

The proportion of thermoplastic blocks in the thermoplastic elastomers which can be used according to the invention is determined, on the one hand, by the thermoplasticity properties which the thermoplastic elastomers should exhibit.

The thermoplastic block(s) are preferentially present in sufficient proportions to preserve the thermoplastic nature of the thermoplastic elastomers which can be used according to the invention. The minimum content of thermoplastic blocks in the thermoplastic elastomers can vary as a function of the conditions of use of the thermoplastic elastomers.

On the other hand, the ability of the thermoplastic elastomers to deform during the preparation of the tyre can also contribute to determining the proportion of the thermoplastic blocks in the thermoplastic elastomers which can be used according to the invention.

Preferably, the thermoplastic blocks of the thermoplastic elastomers exhibit a number-average molecular weight (Mn) ranging from 5000 g/mol to 150 000 g/mol, so as to confer, on the thermoplastic elastomers, good elastomeric properties and a mechanical strength which is sufficient and compatible with the use as tyre external sidewall.

According to the invention, the thermoplastic elastomer(s) can be selected from the group consisting of styrene/butadiene (SB), styrene/isoprene (SI), styrene/butadiene/isoprene (SBI), styrene/butadiene/isoprene/styrene (SBIS), styrene/butadiene/styrene (SBS), styrene/isoprene/styrene (SIS) and styrene/optionally partially hydrogenated butadiene-styrene copolymer/styrene (SOE) block copolymers and the mixtures of these copolymers.

Preferably in the invention, the thermoplastic elastomer(s) are selected from the group consisting of styrene/butadiene/styrene (SBS), styrene/isoprene/styrene (SIS) and styrene/optionally partially hydrogenated butadiene-styrene copolymer/styrene (SOE) block copolymers and the mixtures of these copolymers.

Preferably again, the thermoplastic elastomer(s) are selected from the group consisting of styrene/butadiene/styrene (SBS) and styrene/optionally partially hydrogenated butadiene-styrene copolymer/styrene (SOE) block copolymers and the mixtures of these copolymers.

Particularly advantageously, the styrene/optionally partially hydrogenated butadiene-styrene copolymer/styrene (SOE) block copolymers are styrene/partially hydrogenated butadiene-styrene copolymer/styrene (SOE) block copolymers. Preferably, the styrene/partially hydrogenated butadiene-styrene copolymer/styrene block copolymers exhibit a molar degree of hydrogenation within a range extending from 30% to 98%, preferably from 50% to 98%, more preferably from 85% to 97%.

Mention may be made, by way of examples of commercially available thermoplastic elastomers which can be used according to the invention, of the elastomers of SIS type sold by Kuraray under the name Hybrar 5125 or sold by Kraton under the name D 1161, or also of the elastomers of linear SBS type sold by Polimeri Europa under the name Europrene SOL T 166 or of star-branched SBS type sold by Kraton under the name D1184. Mention may also be made of the elastomers sold by Dexco Polymers under the name Vector (for example, Vector 4114 or Vector 8508).

Preferably, the content of thermoplastic elastomer(s) comprising at least one elastomer block and at least one thermoplastic block, the elastomer block(s) not denoting one or more polyisobutylene block(s), in the composition is within a range extending from 1 to 50 phr, preferably from 5 to 45 phr, more preferentially from 10 to 40 phr, more preferentially still from 15 to 35 phr.

Particularly preferably, the thermoplastic elastomer(s) comprising at least one elastomer block and at least one thermoplastic block, the elastomer(s) not denoting one or more polyisobutylene block(s), are the only thermoplastic elastomers of the elastomeric matrix.

II-1-c Other Elastomers

The elastomeric matrix of the composition of the external sidewall which can be used according to the invention can comprise diene or thermoplastic elastomers other than the diene elastomer selected from the group consisting of butadiene polymers having a glass transition temperature of less than or equal to −50° C., and the thermoplastic elastomer comprising at least one elastomer block and at least one thermoplastic block, the thermoplastic elastomer not comprising a polyisobutylene block, but this is not obligatory or even preferable.

Advantageously, the composition of the external sidewall which can be used according to the invention does not comprise another elastomer than the diene elastomer selected from the group consisting of butadiene polymers having a glass transition temperature of less than or equal to −50° C., and the thermoplastic elastomer comprising at least one elastomer block and at least one thermoplastic block, the thermoplastic elastomer not comprising a polyisobutylene block, or comprises less than 20 phr, preferably less than 10 phr, more preferably less than 10 phr, thereof.

II-2 Liquid plasticizer

The external sidewall composition of the tyre according to the invention comprises a liquid plasticizer exhibiting a glass transition temperature of less than −70° C.

Advantageously, liquid plasticizer exhibiting a glass transition temperature of less than −70° C. comprises from 45% to 100% by weight, preferably from 60% to 100% by weight, more preferably from 70% to 100% by weight, of glycerol unsaturated fatty acid triester. Particularly advantageously, the unsaturated fatty acid of the unsaturated fatty acid triester is an unsaturated $C_{12}$-$C_{22}$ fatty acid (that is to say, comprising from 12 to 22 carbon atoms).

Triester and fatty acid is understood to also mean a mixture of triesters or a mixture of fatty acids, respectively. The fatty acid of the glycerol unsaturated fatty acid triester preferably comprises more than 60% by weight, more preferentially more than 70% by weight, of an unsaturated $C_{18}$ fatty acid, that is to say selected from the group consisting of oleic acid, linoleic acid, linolenic acid and their mixtures. More preferentially, whether it is of synthetic origin or natural origin, the fatty acid used comprises more than 60% by weight, more preferentially still more than 70% by weight, of oleic acid.

Particularly advantageously, the glycerol unsaturated fatty acid triester is glycerol trioleate. Mention will in particular be made, among the preferential glycerol trioleates, as examples of natural compounds, of sunflower or rapeseed vegetable oils.

Thus, according to the invention, the liquid plasticizer exhibiting a glass transition temperature of less than −70° C. can be a vegetable oil, preferably a vegetable oil selected from the group consisting of sunflower oil, rapeseed oil and their mixtures (it being understood that it exhibits a Tg of less than −70° C.). Preferably, the vegetable oil, preferably the vegetable oil selected from the group consisting of sunflower oil, rapeseed oil and their mixtures, exhibits a high content of oleic acid (more than 60%, more preferentially more than 70%, by weight).

Such triesters having a high content of oleic acid are well known; they have been described, for example in Application WO 02/088238, as plasticizing agents in tyre treads.

The content of liquid plasticizer exhibiting a glass transition temperature of less than −70° C. in the composition of the external sidewall of the tyre according to the invention can be within a range extending from 1 to 50 phr, preferably from 2 to 40 phr, more preferably from 5 to 30 phr.

II-3 Reinforcing Filler

The composition of the external sidewall of the tyre according to the invention additionally comprises a reinforcing filler, known for its abilities to reinforce a rubber composition which can be used for the manufacture of tyres.

The reinforcing filler can comprise carbon black and/or silica. Advantageously, the reinforcing filler predominantly, preferably exclusively, comprises carbon black.

The blacks which can be used in the context of the present invention can be any black conventionally used in tyres or their treads ("tyre-grade" blacks). Among the latter, mention will more particularly be made of the reinforcing carbon blacks of the 100, 200 and 300 series, or the blacks of the 500, 600 or 700 series (ASTM grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, Applications WO 97/36724 or WO 99/16600).

Mention may be made, as examples of organic fillers other than carbon blacks, of functionalized polyvinyl organic fillers, such as described in Applications WO 2006/069792, WO 2006/069793, WO 2008/003434 and WO 2008/003435.

Advantageously, the carbon black predominantly, preferably exclusively, comprises a carbon black exhibiting a BET specific surface of less than 70 m²/g, preferably of less than 50 m²/g, preferably a BET specific surface within a range extending from 11 to 49 m²/g, more preferably from 21 to 49 m²/g.

The BET specific surface of the carbon blacks is measured according to Standard D6556-10 [multipoint (a minimum of 5 points) method—gas: nitrogen—relative pressure $p/p_o$ range: 0.1 to 0.3].

The silicas which can be used in the context of the present invention can be any silica known to a person skilled in the art, in particular any precipitated or fumed silica exhibiting a BET specific surface and a CTAB specific surface which are both less than 450 m²/g, preferably from 30 to 400 m²/g.

The BET specific surface of the silica is determined in a known way by gas adsorption using the Brunauer-Emmett-Teller method described in The Journal of the American Chemical Society, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface of the silica is determined according to French Standard NF T 45-007 of November 1987 (method B).

Preferably, the silica exhibits a BET specific surface of less than 200 m²/g and/or a CTAB specific surface of less than 220 m²/g, preferably a BET specific surface within a range extending from 125 to 200 m²/g and/or a CTAB specific surface within a range extending from 140 to 170 m²/g.

Mention will be made, as silicas which can be used in the context of the present invention, for example, of the highly dispersible precipitated silicas (termed "HDSs") Ultrasil 7000 and Ultrasil 7005 from Evonik, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

In order to couple the reinforcing silica to the diene elastomer, use is made, in a well-known way, of an at least bifunctional coupling agent (or bonding agent) intended to provide a satisfactory connection, of chemical and/or physical nature, between the silica (surface of its particles) and the diene elastomer. Use is made in particular of organosilanes or polyorganosiloxanes which are at least bifunctional.

A person skilled in the art can find coupling agent examples in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

Mention may in particular be made of alkoxysilane polysulfide compounds, especially bis(trialkoxysilylpropyl) polysulfides, very particularly bis(3-triethoxysilylpropyl) disulfide (abbreviated to "TESPD") and bis(3-triethoxysilylpropyl) tetrasulfide (abbreviated to "TESPT"). It should be remembered that TESPD, of formula $[(C_2H_5O)_3Si(CH_2)_3S]_2$, is in particular sold by Degussa under the name Si266 or Si75 (in the second case, in the form of a mixture of disulfide (at 75% by weight) and of polysulfides). TESPT, of formula $[(C_2H_5O)_3Si(CH_2)_3S]_4$, is sold in particular by Degussa under the name Si69 (or X50S when it is supported at 50% by weight on carbon black), in the form of a commercial mixture of polysulfides $S_x$ with a mean value for x which is approximately 4.

The content of reinforcing filler in the composition is preferably within a range extending from 5 to 70 phr, preferably from 5 to 55 phr, more preferably from 5 to 45 phr.

II-4 Crosslinking System

The system for crosslinking the composition of the external sidewall of the tyre according to the invention can be based on molecular sulfur and/or on sulfur donors and/or on peroxide, which are well known to a person skilled in the art.

The crosslinking system is preferentially a vulcanization system based on sulfur (molecular sulfur and/or sulfur-donating agent).

The sulfur is used at a preferential content of between 0.5 and 10 phr. Advantageously, the content of sulfur is between 0.5 and 2 phr, preferably between 0.5 and 1.5 phr and more preferably between 0.5 and 1.4 phr.

The composition of the tread of the tyre according to the invention advantageously comprises a vulcanization accelerator, which is preferably selected from the group consisting of accelerators of the type of the thiazoles and their derivatives, accelerators of the types of the sulfenamides and thioureas and of their mixtures. Advantageously, the vulcanization accelerator is selected from the group consisting of 2-mercaptobenzothiazyl disulfide (MBTS), N-cyclohexyl-2-benzothiazolesulfenamide (CBS), N,N-dicyclohexyl-2-benzothiazolesulfenamide (DCBS), N-(tert-butyl)-2-benzothiazolesulfenamide (TBBS), N-(tert-butyl)-2-benzothiazolesulfenimide (TBSI), morpholine disulfide, N-morpholino-2-benzothiazolesulfenamide (MBS), dibutylthiourea (DBTU) and of their mixtures. Particularly preferably, the primary vulcanization accelerator is N-cyclohexyl-2-benzothiazolesulfenamide (CBS).

The content of vulcanization accelerator is preferentially within a range extending from 0.2 to 10 phr, preferably from 0.2 to 7 phr, more preferably from 0.6 to 2 phr.

Advantageously, the sulfur or sulfur donor/vulcanization accelerator ratio by weight varies from 0.8 to 1.2.

II-5 Various Additives

The rubber compositions of the external sidewall of the tyre according to the invention can also comprise all or part of the usual additives known to a person skilled in the art and generally used in rubber compositions for tyres, in particular external sidewall compositions, such as, for example, plasticizers other than those mentioned above (such as plasticizing resins), fillers (other than those mentioned above), pigments, protective agents, such as antiozone waxes, chemical antiozonants or antioxidants, or anti-fatigue agents.

II-6 Preparation of the Rubber Compositions

The rubber composition in accordance with the invention is manufactured in appropriate mixers using two successive preparation phases well known to a person skilled in the art:
- a first phase of thermomechanical working or kneading ("non-productive" phase), which can be carried out in a single thermomechanical stage during which all the necessary constituents, in particular the elastomeric matrix, the fillers, the plasticizers and the optional other various additives, with the exception of the crosslinking system, are introduced into an appropriate mixer, such as a standard internal mixer (for example of 'Banbury' type). The incorporation of the filler in the elastomer can be carried out in one or more goes by thermomechanically kneading.

In the case where the filler, in particular the carbon black, is already incorporated, in all or in part, in the elastomer in the form of a masterbatch, as is described, for example, in Applications WO 97/36724 and WO 99/16600, it is the masterbatch which is directly kneaded and, if appropriate, the other elastomers or fillers present in the composition which are not in the masterbatch form, and also the optional other various additives other than the crosslinking system, are incorporated.

The non-productive phase is carried out at high temperature, up to a maximum temperature of between 110° C. and 200° C., preferably between 130° C. and 185° C., for a period of time generally of between 2 and 10 minutes.
- a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The crosslinking system is then incorporated and the combined mixture is then mixed for a few minutes, for example between 5 and 15 min.

The final composition thus obtained is subsequently calendered, for example in the form of a sheet or of a plaque, in particular for a laboratory characterization, or also extruded in the form of a rubber semi-finished (or profiled) element which can be used, for example, as external sidewall of a tyre for a passenger vehicle.

The composition can be either in the raw state (before crosslinking or vulcanization) or in the cured state (after crosslinking or vulcanization), can be a semi-finished product which can be used in a tyre.

The curing can be carried out, in a way known to a person skilled in the art, at a temperature generally of between 130° C. and 200° C., under pressure, for a sufficient time which can vary, for example, between 5 and 90 min as a function in particular of the curing temperature, of the crosslinking system adopted, of the kinetics of crosslinking of the composition under consideration or also of the size of the tyre.

III—EXAMPLES

III-1 Measurements and Test Used

Depth of Grooves

In order to measure the depth of grooves, use is made of a tyre sidewall test specimen with a square section (side 15 cm) and with a thickness of 9 mm obtained by moulding. The curing of the test specimens is carried out under a pressure of 16 bar at 170° C. for 15 minutes. The test specimen is fitted to the bed of a machine-tool. A cone made of hard steel with a length of 7 mm, the angle at the vertex of which is 75°, is attached to the tool holder of the machine. To produce the cones, the radius of curvature at the end is specified at less than 0.1 mm. The cones are cleaned before use. The cone, from the point of first contact (indentation), sinks in by 5 mm. After the desired sinking in has been obtained, the cone is moved parallel to the mixture plate, at a rate of 30 mm per second. The appearance of the scratches which appear at the rear of the cone subsequent to the tearing of the mixture is recorded at a sufficient distance, of the order of a centimetre, from the first point at which the cone was sunk into the mixture, so that the scratch observed is not affected by a possible transitory phenomenon and becomes independent of the length slid over.

In order to compare the sidewall which can be used according to the invention with the control sidewall, the confocal microscope is used to measure the depth of the scratches. Each measurement by confocal microscopy is carried out at three different points (two on the rubber close to the scratch and one at the bottom of the scratch), where the latter is sufficiently open for the measurement to be able to be carried out.

This measurement of the scratch depth is carried out at ten different sites of the scratch and then the mean of the ten depth measurements is calculated. For greater readability, the results are shown in base 100 (percentage), the value 100 being assigned to the control. A result greater than 100 indicates a decrease in the value concerned. Thus, a percentage of greater than 100% means that the scratch is not as deep as that of the reference tyre sidewall.

Dynamic Properties (Dynamic Shear Modulus ($G^*$) and Loss Modulus ($G''$))

The dynamic properties $G^*$ and $G''$ are measured on a viscosity analyser (Metravib V A4000), according to Standard ASTM D 5992-96. The response of a sample of desired vulcanized composition (cylindrical test specimen with a thickness of 2 mm and a cross section of 78.5 $mm^2$), subjected to a simple alternating sinusoidal shear stress, at a frequency of 10 Hz, at a temperature of 23° C. and according to Standard ASTM D 1349-99, is recorded. A peak-to-peak strain amplitude sweep is carried out from 0.1% to 50% (outward cycle) and then from 50% to 1% (return cycle). The results made use of are the complex dynamic shear modulus ($G^*$) and the loss modulus ($G''$). For the return cycle, the value of $G^*$ at 20% strain and also the value of $G''$ at 20% strain are indicated.

For greater readability, the results are shown in base 100 (percentage), the value 100 being assigned to the control. A result of less than 100 will indicate an increase in the value concerned and, conversely, a result of greater than 100 will indicate a decrease in the value concerned. In other words, a percentage of greater than 100% means that the loss modulus G" falls, indicating a decrease in the hysteresis and thus an improvement in the rolling resistance. Likewise, if the complex dynamic shear modulus G* falls, then the percentage relative to G* increases. In this case, the stiffness is improved, in particular for use in an external sidewall composition for a tyre.

Ozone Test Developed in the Laboratory

In order to measure the resistance to ozone of the materials, several test-specimen strips are tensioned at various strains ranging from 10% strain to 100% strain in increments of 10% starting from 10% strain, then in increments of 5% starting from 50% strain. After 240 hours of exposure to a temperature of 38° C. and an ozone content of 40 ppm, the maximum extension value for which the test specimen did not break is taken into account. This enables the materials to be categorized.

III-2 Preparation of the Compositions

The tests which follow are carried out in the following way: the diene elastomer, the thermoplastic elastomer, the reinforcing filler, the liquid plasticizer and also the various other ingredients, with the exception of the vulcanization system, are successively introduced into an internal mixer (final degree of filling: approximately 70% by volume), the initial vessel temperature of which is approximately 60° C. Thermomechanical working (non-productive phase) is then carried out in one stage, which lasts in total approximately from 3 to 4 min, until a maximum "dropping" temperature of 150° C. is reached.

The mixture thus obtained is recovered and cooled and then sulfur and the vulcanization accelerator are incorporated on a mixer (homofinisher) at 30° C., everything being mixed (productive phase) for an appropriate time (for example between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a profiled element.

The samples thus produced were cured for 25 minutes at 150° C. in a bell press. The samples were analysed after having been cooled at ambient temperature for 24 hours.

In this instance, the processing of the elastomeric compositions is carried out by means of a mixer of the Haake RM 3000 type of 360 cm$^3$ with blades of CAM type.

III-3 Rubber Test

The object of the examples presented in Table 1 is to compare the resistance to outside attacks, the rolling resistance and the stiffness of compositions in accordance with the invention (I1, I2) with those of a control composition (C1) which differs from the composition I1 only in that the liquid plasticizer exhibits a glass transition temperature of greater than −70° C. Their formulations (in phr) and their properties have been summarized in Table 1 below.

TABLE 1

|  | C1 | I1 | I2 |
| --- | --- | --- | --- |
| Ingredients |  |  |  |
| Polybutadiene rubber[1] | 65 | 65 | 75 |
| SBS[2] | 35 | 35 | 25 |
| Carbon black[3] | 20 | 20 | 20 |
| Oil[4] | 15 | — | — |
| Oil[5] | — | 15 | 15 |
| Antioxidant[6] | 1.5 | 1.5 | 1.5 |
| Antiozone wax[7] | 1 | 1 | 1 |

TABLE 1-continued

|  | C1 | I1 | I2 |
| --- | --- | --- | --- |
| Stearic acid | 1 | 1 | 1 |
| Zinc oxide | 2.4 | 2.4 | 2.4 |
| Sulfur | 1.2 | 1.2 | 1.2 |
| Accelerator[8] | 1.2 | 1.2 | 1.2 |
| Properties |  |  |  |
| Groove (%) | 100 | 115 | 133 |
| Modulus G" (%) | 100 | 127 | 120 |
| Modulus G* (%) | 100 | 122 | 123 |

[1]BR ND ML63
[2]Block copolymer comprising 31% by weight of styrene of the D1101 series from Kraton
[3]Carbon black N550 (name according to Standard ASTM D-1765) from Cabot
[4]MES oil, Catenex SNR from Shell
[5]Sunflower oil comprising 85% by weight of oleic acid, Lubrirob Tod 1880 from Novance
[6]Antioxidant, Santoflex 6PPD from Solutia,
[7]Antiozone wax, Varazon 4959 from Sasol Wax
[8]Accelerator, Santocure CBS from Solutia These results show the compositions in accordance with the invention making it possible to improve the resistance to attacks and the hysteresis, in comparison with the control compositions, while allowing dynamic properties (the stiffness G*) in accordance with use in tyres. It has furthermore been found that the compositions in accordance with the invention exhibit very good resistances to ozone (data not presented).

The invention claimed is:

1. A tire provided with an external sidewall, the external sidewall comprising a composition based on at least:
   an elastomeric matrix consisting of a diene elastomer of butadiene homopolymers having a glass transition temperature of less than or equal to −50° C. and a thermoplastic elastomer comprising at least one elastomer block and at least one thermoplastic block, the thermoplastic elastomer having a styrene content of between 10% and 40% by weight and not comprising a polyisobutylene block;
   a liquid plasticizer exhibiting a glass transition temperature of less than −70° C.;
   a crosslinking system; and
   a reinforcing filler comprising carbon black,
   wherein a content of the at least one diene elastomer is within a range extending from 55 to 95 phr,
   wherein a content of the thermoplastic elastomer is within a range extending from 5 to 45 phr,
   wherein the liquid plasticizer comprises from 45% to 100% by weight of glycerol unsaturated fatty acid triester and a content of the liquid plasticizer is within a range extending from 5 to 30 phr, and
   wherein a content of the reinforcing filler is within a range extending from 5 to 45 phr.

2. The tire according to claim 1, wherein the at least one elastomer block of the thermoplastic elastomer exhibits a glass transition temperature of less than or equal to −50° C.

3. The tire according to claim 1, wherein the at least one elastomer block of the thermoplastic elastomer is selected from the group consisting of non-hydrogenated and partially hydrogenated polyisoprenes, non-hydrogenated and partially hydrogenated polybutadienes, non-hydrogenated and partially hydrogenated copolymers of styrene and of butadiene, and mixtures thereof.

4. The tire according to claim 1, wherein the at least one thermoplastic block of the thermoplastic elastomer is selected from the group consisting of polyolefins, polyurethanes, polyamides, polyesters, polyacetals, polyethers, polyphenylene sulfides, polyfluorinated compounds, polystyrenes, polycarbonates, polysulfones, poly(methyl methacrylate), polyetherimide, thermoplastic copolymers and mixtures thereof.

5. The tire according to claim 1, wherein the at least one thermoplastic block of the thermoplastic elastomer is selected from the group consisting of polystyrenes, polyesters, polyamides, polyurethanes and mixtures thereof.

6. The tire according to claim 1, wherein the thermoplastic elastomer is selected from the group consisting of styrene/butadiene (SB), styrene/isoprene (SI), styrene/butadiene/isoprene (SBI), styrene/butadiene/isoprene/styrene (SBIS), styrene/butadiene/styrene (SBS), styrene/isoprene/styrene (SIS) and styrene/optionally partially hydrogenated butadiene-styrene copolymer/styrene (SOE) block copolymers and mixtures thereof.

7. The tire according to claim 1, wherein the thermoplastic elastomer is selected from the group consisting of styrene/butadiene/styrene (SBS) and styrene/optionally partially hydrogenated butadiene-styrene copolymer/styrene (SOE) block copolymers and mixtures thereof.

8. The tire according to claim 1, wherein the fatty acid of the glycerol unsaturated fatty acid triester comprises more than 60% by weight of a fatty acid selected from the group consisting of oleic acid, linoleic acid, linolenic acid and mixtures thereof.

9. The tire according to claim 1, wherein the fatty acid of the glycerol unsaturated fatty acid triester comprises more than 60% by weight of oleic acid.

10. The tire according to claim 1, wherein the glycerol unsaturated fatty acid triester is glycerol trioleate.

11. The tire according to claim 1, wherein the liquid plasticizer exhibiting a glass transition temperature of less than −70° C. is a vegetable oil.

12. The tire according to claim 1, wherein the reinforcing filler further comprises silica.

13. The tire according to claim 1, wherein the carbon black exhibits a BET specific surface area of less than 70 m$^2$/g.

* * * * *